United States Patent [19]

Negoto et al.

[11] Patent Number: 5,463,230
[45] Date of Patent: Oct. 31, 1995

[54] ACTIVE MATRIX BOARD

[75] Inventors: Hidenori Negoto; Mikio Katayama, both of Ikoma; Kiyoshi Nakazawa, Fujiidera; Hiroaki Kato, Nara; Yuzuru Kanemori, Tenri; Takayoshi Nagayasu, Nara, all of Japan

[73] Assignee: Sharp Kabushiki Kaisha, Osaka, Japan

[21] Appl. No.: 338,795

[22] Filed: Nov. 7, 1994

Related U.S. Application Data

[63] Continuation of Ser. No. 60,511, May 12, 1993, abandoned, which is a continuation of Ser. No. 857,724, Mar. 26, 1992, abandoned, which is a continuation of Ser. No. 564,287, Aug. 8, 1990, abandoned.

[30] Foreign Application Priority Data

Aug. 11, 1989 [JP] Japan ..................................... 1-209401

[51] Int. Cl.$^6$ .............................. H01L 27/01; H01L 27/13
[52] U.S. Cl. .................... 257/66; 257/59; 257/72; 359/59
[58] Field of Search .......................... 350/333; 357/23.7; 257/57, 59, 66, 71, 72; 359/59

[56] References Cited

U.S. PATENT DOCUMENTS 4,843,438  6/1989  Koden et al. ................................. 357/2
4,955,697  9/1990  Tsukada et al. .......................... 350/333

FOREIGN PATENT DOCUMENTS 0288011  10/1988  European Pat. Off. .

OTHER PUBLICATIONS

Patent Abstract of Japan, vol. 10, No. 351 (P-520) [2407], 27th Nov. 1986; & JP-A-61 151 516 (Seiko) Oct. 7, 1986.

Primary Examiner—Sara W. Crane
Attorney, Agent, or Firm—Nixon & Vanderhye

[57] ABSTRACT

An active matrix board comprising pixel electrodes arranged in a matrix fashion on an insulating substrate, and scan lines each having an addition capacity electrode placed in a superposed relation with a portion of a corresponding one of the pixel electrodes, said scan lines each comprising a first scan line formed in an area other than the area in which said addition capacity electrode is held in a superposed relation with said pixel electrode, and a second scan line formed to cover said first scan line and having said addition capacity electrode as its part, whereby the possibility of pixel defect occurrence is reduced and the production yield of display apparatuses is improved.

6 Claims, 3 Drawing Sheets

ACTIVE MATRIX BOARD

This is a continuation of application Ser. No. 08/060,511, filed May 12, 1993, which was a continuation of application Ser. No. 07/857,724, filed Mar. 26, 1992, which was a continuation of application Ser. No. 07/564,287, filed Aug. 8, 1990, all abandoned.

CROSS REFERENCE TO RELATED APPLICATIONS

This application is related to commonly assigned copending U.S. Pat. Ser. No. 07/545,956 filed Jul. 2, 1990 in the name of Messrs. Katayama, Negoto, Kato, Imaya, Kanemori and Nakazawa entitled "An Active Matrix Board".

BACKGROUND OF THE INVENTION

1. Field of the Invention

This invention relates to an active matrix board having an addition capacity.

2. Description of the Prior Art

A display pattern is formed on the screen of liquid crystal display devices, EL display devices, plasma display devices, etc., by selectively driving picture element electrodes arranged in a matrix. A voltage is applied between the selected picture element electrode and the opposing electrode positioned opposite the selected picture element electrode so as to optically modulate a display medium disposed therebetween. This optical modulation is observed as the display pattern. One drive method used to drive picture element electrodes is the active-matrix drive method wherein the independent picture element electrodes are arranged in rows and driven by switching elements that are connected with the corresponding picture element electrodes. The switching elements which selectively drive the picture element electrodes are generally thin-film transistor (TFT) elements, metal-insulator-metal (MIM) elements, MOS transistors, diodes, or varistors. Active-matrix drive systems make high-contrast displays possible and are used in liquid crystal television, word processors and computer terminal display devices.

An active matrix board employed in such a display apparatus may be provided with an addition capacity so as to enable sufficient contrast to be obtained. The addition capacity is formed between each pixel electrode and an addition capacity electrode placed on the pixel electrode so as to sandwich an insulating film or the like therebetween.

One example of a conventional active matrix board having an addition capacity is shown in FIG. 3. FIGS. 4 and 5, respectively, are sectional views taken along lines IV'—IV' and V—V in FIG. 3. In this active matrix board, a gate bus line 3 also function as both an addition capacity electrode and an addition capacity line. As shown in FIG. 3, a TFT 20 acting as a switching element is provided in a corner portion of each of the pixel electrodes 11 arranged in a matrix fashion. Each pixel electrode 11 and the corresponding TFT 20 are electrically connected to each other by a drain electrode 17. The TFT 20 and a corresponding source bus line 12 are connected to each other by a source electrode 16.

Each gate bus line 3 comprises a first gate bus line 15 and a second gate bus line 18. A gate electrode 13 of each TFT 20 is branched from the second gate bus line 18. An end of the pixel electrode 11 is layered on the gate bus line 3 so as to sandwich a gate insulating film 5 therebetween at a location opposite to the side where the TFT 20 is disposed on the gate bus line 3 (FIG. 5). In this area, the end of the pixel electrode 11 is layered on both the first gate bus line 15 and the second gate bus line 18. In this board, a portion of each gate bus line also functions as an addition capacity electrode in this way. In other words, an addition capacity 14 is formed by an area in which the end portion of the pixel electrode 11 and the gate bus line 3 are placed in a superposed relation.

The sectional configuration of a region adjacent each TFT 20 will be explained with reference to FIG. 4. On a glass substrate 1 is disposed a gate electrode 13 branched from each second gate bus line 18, with an anode oxide film 4 formed on the gate electrode 13. A gate insulating film 5 is placed over the entire surface of the anode oxide film 4, and a semiconductor film 6 is formed on the gate electrode 13 so as to sandwich the gate insulating film 5 and anode oxide film 4 therebetween. A source electrode 16 and a drain electrode 17 are formed on the semiconductor film 6. The source electrode 16 comprises a first source electrode 7 and a second source electrode 8. The drain electrode 17 comprises a first drain electrode 9 and a second drain electrode 10. A pixel electrode 11 is placed over an end portion of the drain electrode 17.

The sectional configuration of each gate bus line 3 will be explained with reference to FIG. 5. Each gate bus line 15 is formed on the glass substrate 1, and a second gate bus line 18 is formed over the entire surface of the first gate bus line 15. An anode oxide film 4 is formed on the second gate electrode 10 in the same manner as the gate electrode 13. The gate insulating film 5 is placed over the entire surface of the anode oxide film 4. An end of the pixel electrode 11 is placed above the region in which the first gate bus line 15 is formed so as to sandwich the gate insulating film 5 therebetween. As mentioned above, an addition capacity 14 is formed by pixel electrode 11 and a portion of a gate bus line 3 on which the pixel electrode 11 is mounted.

In the active matrix board, each first gate bus line 15 is formed of a low-resistance metal material, such as Al, Mo, W or the like. The use of a metal material having low specific resistance for the first gate bus line 15 of each gate bus line 3 eliminates the possibility of any signal delay being caused on the gate bus line 3 and enables high image quality to be obtained.

On the other hand, however, such a low-resistance metal lacks acid resistance. Therefore, if any slight pinhole is present in a layer formed on the gate bus line 3, the gate bus line 3 may be eroded by an etchant used in a subsequent stage of, for example, the formation of TFT 20. In view of this fact, each second gate bus line 18 is made of a metal material having good acid resistance, such as Ta or the like, to thereby prevent such erosion trouble. That is, the second gate bus line 18 is so formed as to cover the entire surface of the first gate bus line 15, whereby the first gate bus line 15 is protected against the action of the etchant used in the subsequent stage of etching.

However, the trouble with the conventional board is that since the addition capacity 14 is positioned on a stepped portion formed by the first and second gate bus lines 15 and 18, a charge leak is likely to develop between the pixel electrode 11 and the gate bus line 3. In a portion subjected to such a charge leak, the charge holding capability of the addition capacity 14 is deteriorated, with the result that there will be caused display variations which in turn lead to image quality degradation. Once a pixel defect is caused, the image quality is noticeably deteriorated and the production yield of display apparatus will be lowered.

SUMMARY OF THE INVENTION

The active matrix board of this invention, which overcomes the above-discussed and numerous other disadvantages and deficiencies of the prior art, comprises an active matrix board comprising pixel electrodes arranged in a matrix fashion on an insulating substrate, and scan lines each having an addition capacity electrode placed in a superposed relation with a portion of a corresponding one of the pixel electrodes said scan lines each comprising a first scan line formed in an area other than the area in which said addition capacity electrode is held in a superposed relation with said pixel electrode, and a second scan line formed to cover said first scan line and having said addition capacity electrode as its part.

In a preferred embodiment, the first scan line is made of a low-resistance metal.

In a preferred embodiment, the second scan line is made of a metal material having resistance to etchant.

In a preferred embodiment, the low-resistance metal is a metal selected from the group consisting of Al, Mo, and W.

In a preferred embodiment, the metal material having resistance to etchant is a metal selected from the group consisting of Ta and W-Ti.

Thus, the invention described herein makes possible the objectives of (1) providing an active matrix board having an addition capacity which is pixel defect-free and is less liable to fluctuations in its charge holding capability; (2) providing an active matrix board with an addition capacity that attains a high image quality display device; and (3) a pixel defect free active matrix board with an addition capacity that attains an improvement of the production yield of display apparatuses.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
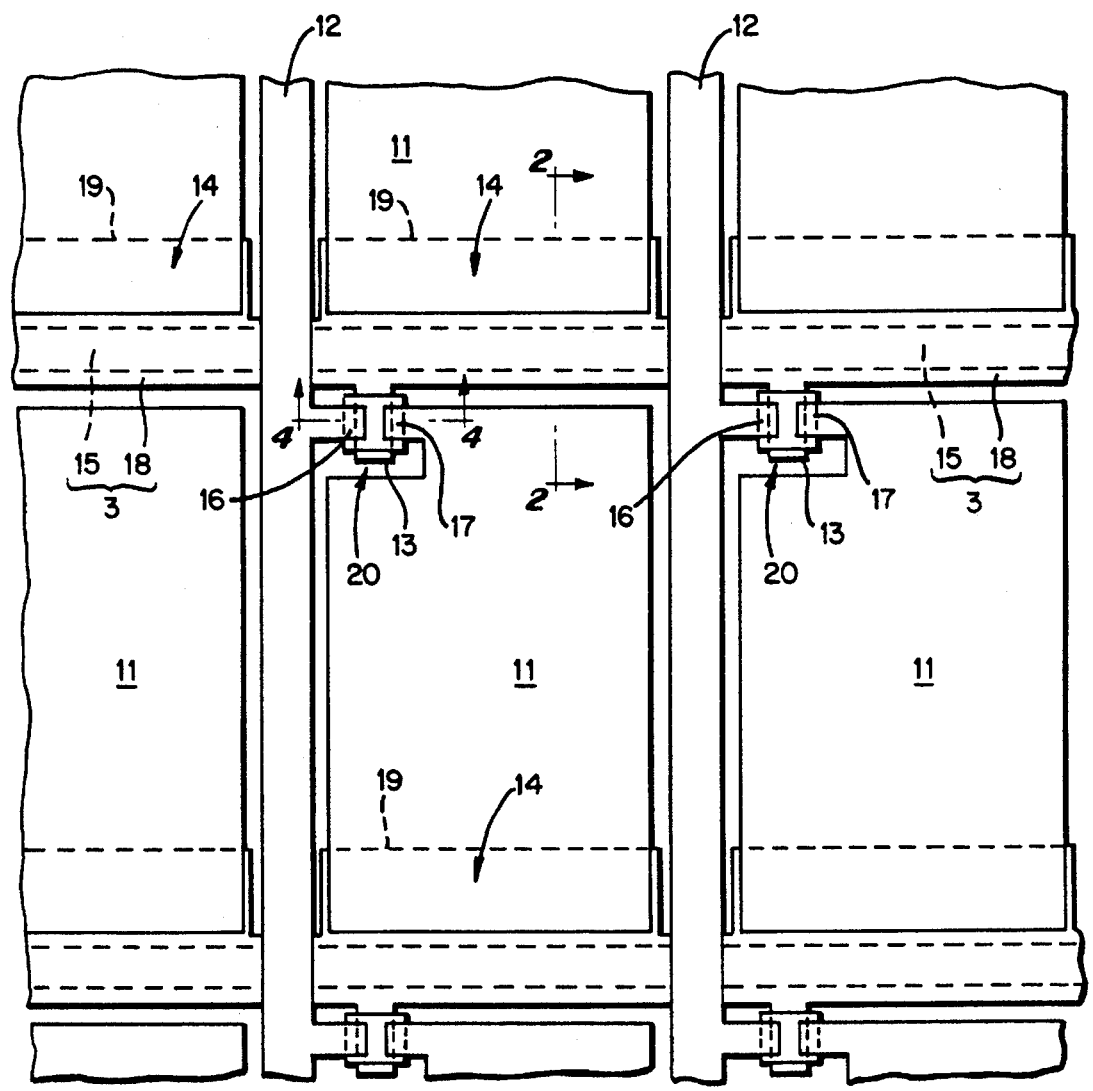
FIG. 1 is a plan view of an active matrix board of this invention.
Figure 2:
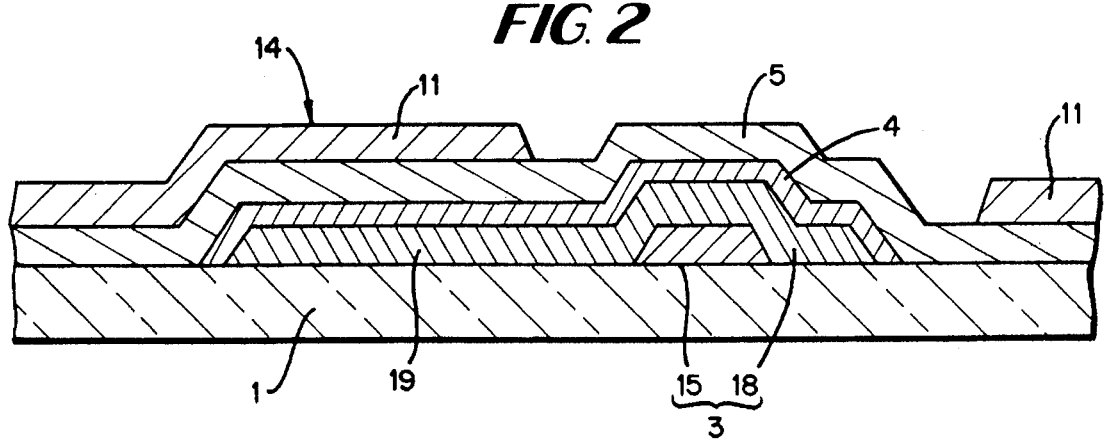
FIG. 2 is a sectional view taken along line II—II in FIG. 1.
Figure 3:
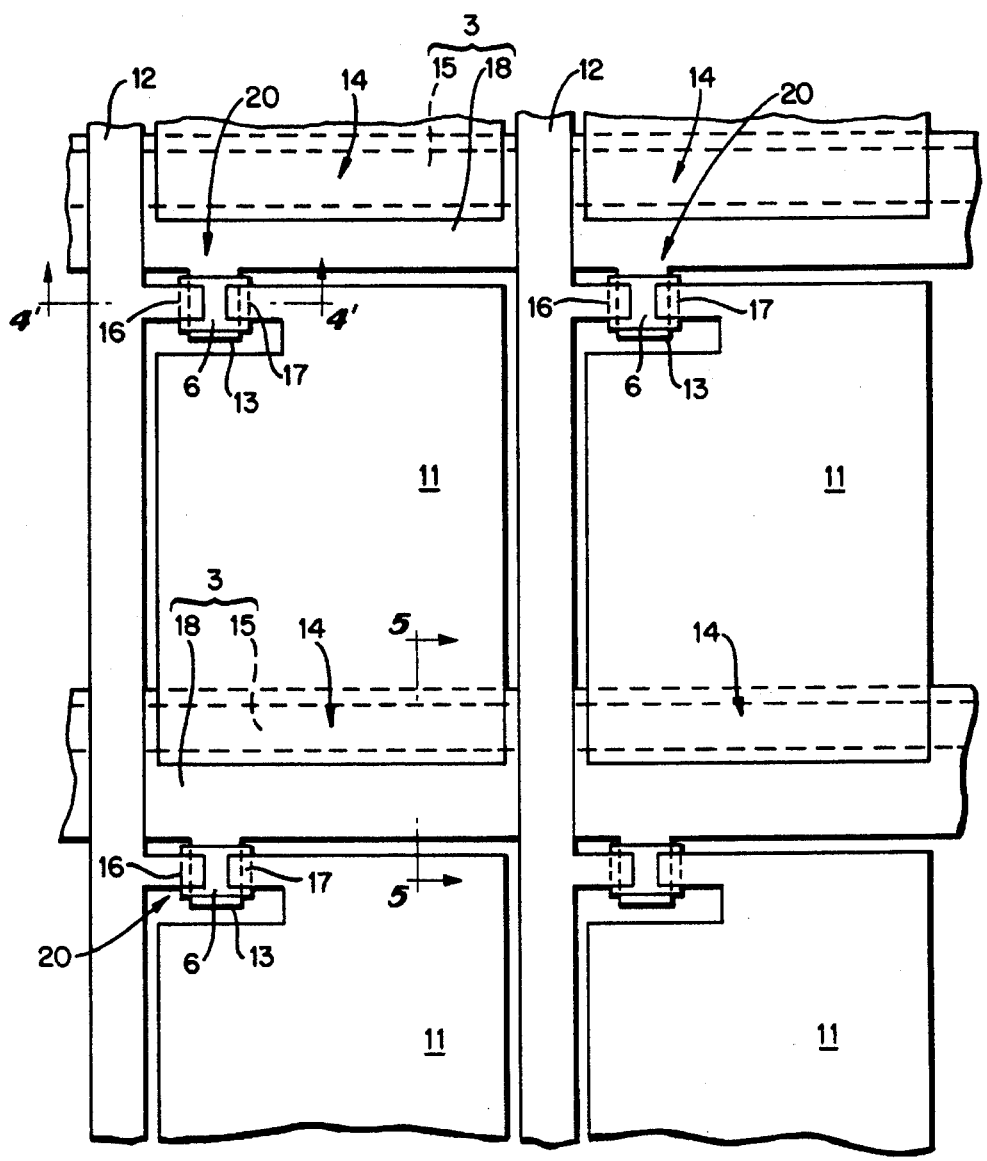
FIG. 3 is a plan view showing a conventional active matrix board.

FIG. 1 shows a plan view of an active matrix board of this invention. FIG. 2 shows a sectional view taken along line II—II in FIG. 1. The active matrix board of the present embodiment comprises pixel electrodes 11 arranged in a matrix fashion on an insulating substrate 1, and gate bus lines 3 each having an addition capacity electrode 19 placed in a superposed relation with a portion of a corresponding one of the pixel electrodes 11. Each gate bus line 3 comprises a first gate bus line 15 that is not placed in a superposed relation with the corresponding pixel electrode 11, and a second gate bus line 18 that covers the first gate bus line 15 and has an addition capacity electrode 19 placed in a superposed relation with the corresponding electrode 11.

In this embodiment, each gate bus line 3 functions as a scan line and, in addition, has a function to operate as an addition capacity electrode and as an addition capacity line. In a corner portion of each of the pixel electrodes 11 arranged in a matrix fashion there is provided a TFT 20 which is operative as a switching element. The pixel electrode 11 and the TFT 20 are electrically connected to each other by a drain electrode 17. A source bus line 12 and the TFT 20 are connected to each other by a source electrode 16.

Each gate bus line 3, as mentioned above, comprises a first gate bus line 15 and a second gate bus line 10. A gate electrode 13 of the TFT 20 is branched from the second gate bus line 18. An addition capacity electrode 19 extending below the pixel electrode 11 is connected to the opposite of the side where the TFT 20 is disposed on the second gate bus line 18. The addition capacity electrode 19 is placed below an end portion of the pixel electrode 11 in a partial superposed relation therewith so as to sandwich a gate insulating film 5. An addition capacity 14 is formed by a portion of the pixel electrode 11, the addition capacity electrode 19, and the gate insulating film 5.

Figure 4:
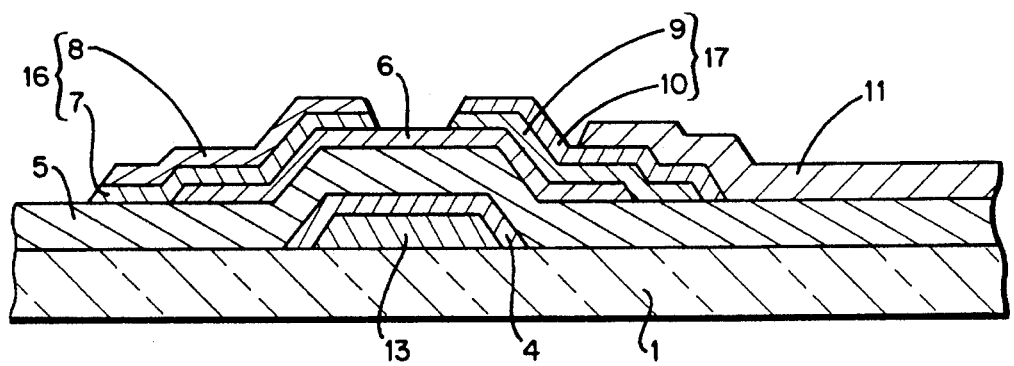
FIG. 4 is a sectional view taken along line IV—IV in FIG. 1 and line IV'—IV' in FIG. 3.
Figure 5:
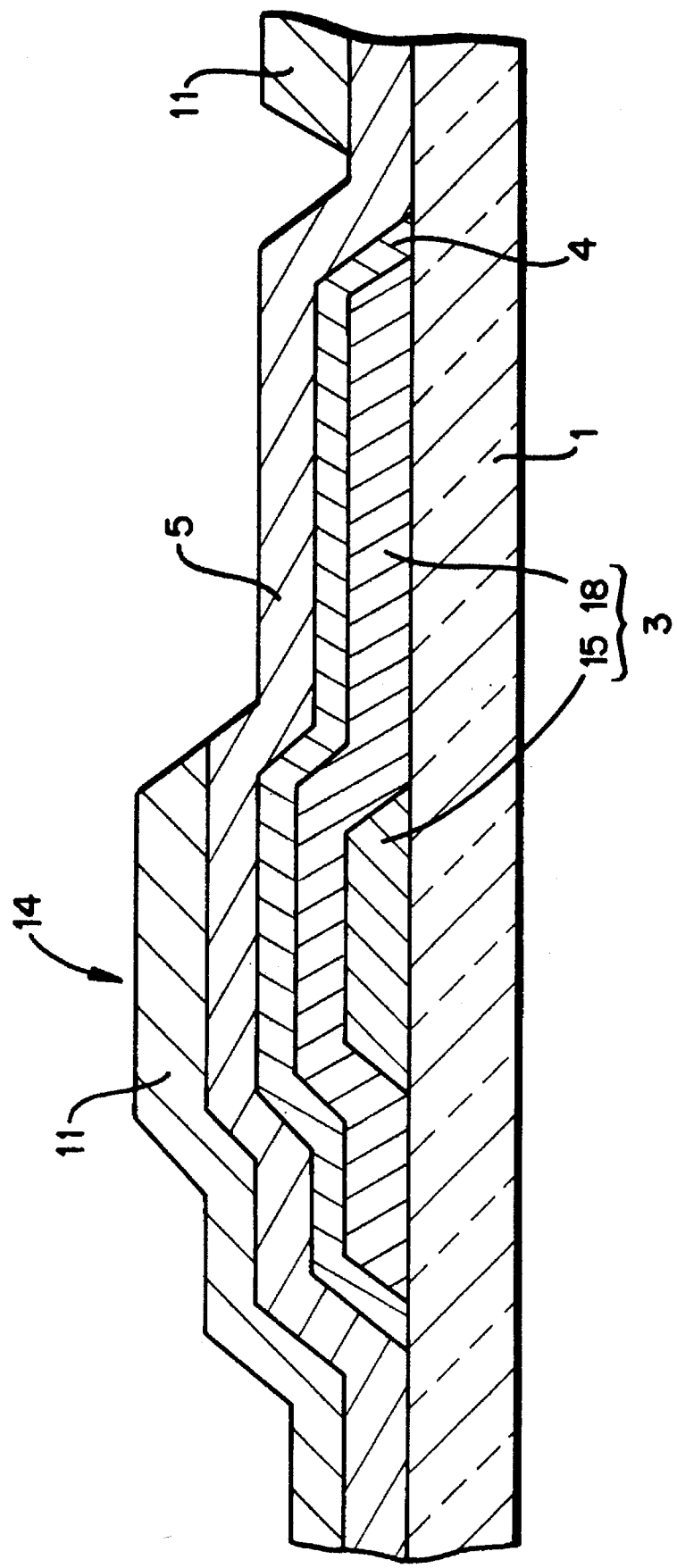
FIG. 5 is a sectional view taken along line V—V in FIG. 3.

A section of an area adjacent the TFT 20 which is taken along line IV—IV is the same as that shown in FIG. 4 for explanation of a conventional arrangement. The sectional configuration of a region adjacent each TFT 20 will be explained with reference to FIG. 4. On a glass substrate 1 is disposed a gate electrode 13 branched from each second gate bus line 18, with an anode oxide film 4 formed on the gate electrode 13. A gate insulating film 5 is placed over the entire surface of the anode oxide film 4, and a semiconductor film 6 is formed on the gate electrode 13 so as to sandwich the gate insulating film 5 and anode oxide film 4 therebetween. A source electrode 16 and a drain electrode 17 are formed on the semiconductor film 6. The source electrode 16 comprises a first source electrode 7 and a second source electrode 8. The drain electrode 17 comprises a first drain electrode 9 and a second drain electrode 10. A pixel electrode 11 is placed over an end portion of the drain electrode 17.

The sectional configuration of each gate bus line 3 will be described with reference to FIG. 2. The first gate bus line 15 is formed on the glass substrate 1, and the second bus line 18 is so formed as to cover the first gate bus line 15. The first gate bus line 15 is made of a metal material having a small specific resistance, such as Al, Mo, W, or the like. The second gate bus line 18 and the aforementioned gate electrode 13 are made of a metal material having high resistance to etchant, such as Ta, W-Ti (an alloy of W and Ti), or the like in such a way that they completely cover the first gate bus line 15.

An anode oxide film 4 is formed over the second gate bus line 18 in the same manner as the aforementioned gate electrode 13. A portion of the second gate bus line 18 extends below the pixel electrode 11 to form an addition capacity electrode 19. The aforementioned gate insulating film 5 is placed over the entire surface of the substrate 1 while covering the anode oxide film 4. The pixel electrode 11, the addition capacity electrode 19, and the gate insulating film 5 serve in combination to form an addition capacity 14.

In this embodiment, each gate bus line 3 includes a first gate bus line 15 made of a metal material having a small specific resistance, so that the resistance of the bus line 3 is reduced. In this embodiment, therefore, no signal delay will occur on the gate bus line 3 and, by employing the embodiment it is possible to obtain excellent image quality even in a large-size display apparatus.

The low-resistance metal used in each first gate bus line 15 lacks acid resistance. For this reason, if any slight pinhole is present in a layer formed on the bus line 3, the bus line 3 may be liable to erosion by the action of an etchant used in subsequent stages of the formations of TFT 30, source bus line 12, and electrode 11 pattern. In this embodiment, however, the second gate bus line 18 is so formed as to cover the first gate bus line 15, the second gate bus line 18 being made of a metal material having excellent acid resistance. Therefore, the first gate bus line 15 is protected against possible erosion by the action of the etchant used in any subsequent etching stage.

Furthermore, in the active matrix board of this embodiment, the first gate bus line 15 is formed in a region which does not overlap the pixel electrode 11; and only the addition capacity electrode 19 which extends from the second gate bus line 18 is held under the pixel electrode 11 in a superposed relation therewith. That is, the addition capacity electrode 19 is formed over a relatively small stepped portion, there being no possibility of charge-leak occurrence between it and the pixel electrode 11. Therefore, the pixel electrode 11 is not liable to any pixel defect, nor is there any possibility of display-fluctuations occurrence due to the deterioration of the charge holding capability of the addition capacity 14.

In the active matrix board of this embodiment, a TFT is used as a switching element, but it is understood that the invention is applicable to any active matrix board using MIM elements, MOS transistor elements, diodes, or varistors.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. An active matrix board, comprising:
   a matrix of pixel electrodes each having a thin-film transistor element connected thereto on an insulating substrate;
   source lines connected to each thin-film transistor element; and
   gate lines operatively coupled to said pixel electrodes wherein each gate line comprises:
   i. a first gate line formed of a low resistance metal and located outside of the areas covered by said pixel electrodes;
   ii. a second gate line fomred of a metal having a substantially higher resistance to etchants than does said first gate line, said second gate line completely covering said first gate line; and
   iii. said second gate line comprising a plurality of projecting parts, each projecting part being an addition capacity electrode extending entirely across the width of the pixel electrode.

2. An active matrix board as in claim 1 wherein said gate lines are scan lines.

3. An active matrix board as in claim 1 wherein said low-resistance metal is one metal selected from a group consisting of Al, Mo and W.

4. An active matrix board as in claims 1 wherein said metal having a substantially higher resistance to etchants is an anodizable metal.

5. An active matrix board according to claim 1, wherein said second scan line is covered with an anodized insulating layer.

6. An active matrix board, comprising:
   a matrix of pixel electrodes each having a thin-film transistor element connected thereto on an insulating substrate;
   source lines connected to each thin-film transistor element; and
   gate lines operatively coupled to said pixel electrodes wherein each gate line comprises:
   i. a first gate line formed of a low resistance metal and located outside of the areas covered by said pixel electrodes;
   ii. a second gate line formed of a metal having a substantially higher resistance at least to etchants used for patterning said pixel electrodes than does said first gate line, said second gate line completely covering said first gate line; and
   iii. said second gate line including a plurality of projecting parts each comprising addition capacity electrodes extending completely across the width of the pixel electrodes,
   wherein an insulating layer is formed between said pixel electrode and said second gate line, and
   wherein said second gate line comprises another projecting part forming a gate electrode for a thin-film transistor of another pixel electrode next to said pixel electrode.

* * * * *